(12) United States Patent
Vande Ryse et al.

(10) Patent No.: US 10,039,230 B2
(45) Date of Patent: Aug. 7, 2018

(54) CHOPPER/BLOWER ARRANGEMENT FOR A HEADER USED ON AN AGRICULTURAL HARVESTER

(71) Applicant: CNH Industrial America LLC, New Holland, PA (US)

(72) Inventors: Yannic Vande Ryse, Bruges (BE); Laurens Nortier, Oostburg (NL); Didier O. M. Verhaeghe, Ypres (BE); Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/889,117

(22) PCT Filed: May 5, 2014

(86) PCT No.: PCT/EP2014/059123
§ 371 (c)(1),
(2) Date: Nov. 4, 2015

(87) PCT Pub. No.: WO2014/180788
PCT Pub. Date: Nov. 13, 2014

(65) Prior Publication Data
US 2016/0081272 A1    Mar. 24, 2016

Related U.S. Application Data

(60) Provisional application No. 61/820,143, filed on May 6, 2013, provisional application No. 61/900,463, filed on Nov. 6, 2013.

(51) Int. Cl.
*A01D 43/08*     (2006.01)
*A01D 45/02*     (2006.01)
(Continued)

(52) U.S. Cl.
CPC ........... *A01D 43/081* (2013.01); *A01D 41/14* (2013.01); *A01D 45/02* (2013.01); *A01D 45/021* (2013.01); *A01D 61/00* (2013.01); *A01D 2101/00* (2013.01)

(58) Field of Classification Search
CPC ...... A01D 41/14; A01D 43/081; A01D 45/02; A01D 45/021; A01D 61/00; A01D 2101/00
See application file for complete search history.

(56) References Cited

U.S. PATENT DOCUMENTS

| 4,251,980 A | * | 2/1981 | Miller | .................. A01D 45/021 56/13.7 |
|---|---|---|---|---|
| 6,672,205 B2 | | 1/2004 | Viaud | |

(Continued)

FOREIGN PATENT DOCUMENTS

| CN | 201718211 U | 1/2011 |
|---|---|---|
| CN | 202068763 U | 12/2011 |
| CN | 202722068 U | 2/2013 |

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

A header assembly for an agricultural combine harvester includes a plurality of row units, and a plurality of chopper/blower units. Each chopper/blower unit is positioned below a respective row unit and has a discharge outlet. At least two of the chopper/blower units have a discharge chute connected with the discharge outlet, and a deflector positioned at a discharge end of the discharge chute. Each deflector is independently adjustable to direct crop material toward a windrow formed under the combine harvester.

13 Claims, 11 Drawing Sheets

(51) Int. Cl.
*A01D 41/14* (2006.01)
*A01D 61/00* (2006.01)
A01D 101/00 (2006.01)

(56) References Cited

U.S. PATENT DOCUMENTS

| | | | |
|---|---|---|---|
| 6,994,020 B2 | 2/2006 | Viaud | |
| 7,047,717 B1 | 5/2006 | Wolters et al. | |
| 7,856,800 B2* | 12/2010 | Straeter | A01D 43/081 56/500 |
| 8,087,223 B2* | 1/2012 | Straeter | A01D 43/081 56/500 |
| 8,196,379 B2* | 6/2012 | Straeter | A01D 43/081 56/500 |
| 8,991,308 B2 | 3/2015 | Roberge et al. | |
| 2011/0113743 A1* | 5/2011 | Straeter | A01D 43/081 56/60 |
| 2014/0053523 A1* | 2/2014 | Straeter | A01D 41/144 56/60 |

* cited by examiner

CHOPPER/BLOWER ARRANGEMENT FOR A HEADER USED ON AN AGRICULTURAL HARVESTER

This application is the U.S. National Stage filing of International Application Serial No. PCT/EP2014/059123, filed on May 5, 2014 which claims priority to U.S. Provisional Applications with Ser. No. 61/820,143, filed May 6, 2013, and 61/900,463, filed Nov. 6, 2013, each of which is hereby incorporated by reference in its entirety.

FIELD OF THE INVENTION

The present invention relates to agricultural harvesters such as combines, and, more particularly, to headers used with such combines.

DESCRIPTION OF THE RELATED ART

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

When harvesting corn, it is sometimes desirable to harvest the non-grain crop material for various purposes, such as livestock feed, biomass for fuel production, etc. Such non-grain crop material can include the non-grain crop material from the separating and cleaning processes within the combine, as well as the stalks and leaves that are stripped through the stripper rolls on the header. In the last several years, this harvesting practice has become even more common The non-grain crop material from within the combine can be easily windrowed for later pickup by removing the chopper/spreader from the back of the combine. However, the stalks and leaves that are stripped through the header during the picking process (also sometimes termed the "stover") are not so easily recovered. The stalks remain attached to the roots during the stripping process, so it is necessary to cut the stalks from the roots, typically with a separate harvesting process after the combine harvesting.

It is known to provide a separate chopper assembly underneath a corn header for the purpose of forming a windrow from the stover. For example, U.S. Pat. No. 8,087, 223 (Straeter) and U.S. Pat. No. 7,856,800 (Straeter) each disclose a product known as a "Cornrower"™, which is manufactured and sold by Straeter Innovation, Inc., Rochester, Ind., USA. A separate chopper assembly is placed underneath each row unit of the corn head, and includes a generally circular blower housing with a number of rotating cutting blades having integral wings to effect the blowing action. The stover is blown rearward from the housing through an enclosed channel. Each of the channels terminate at a conveyor which conveys the stover laterally inward to form the windrow.

The "Cornrower" described above is effective to chop the stover and form a windrow under most operating conditions. However, the Cornrower is not effective under high moisture corn conditions, and tends to plug during operation. Moreover, the conveyor arrangement used to form the windrow cannot be used with a folding corn head. Further, the Cornrower requires significant power to operate and reduces the power output of the combine harvester.

What is needed in the art is a harvesting arrangement which allows the corn stover to be chopped and windrowed under high moisture conditions, without significantly reducing the power output of the combine harvester.

SUMMARY OF THE INVENTION

The present invention provides a chopper/blower arrangement for a corn header, with discharge chutes and deflectors provided on at least some of the chopper/blower units to directly deposit the stover in a windrow. Some or all of the deflectors are independently adjustable from one row to another so that the stover can be effectively deposited into a windrow beneath the combine. A controller matches precision farming data with the geographic area being harvested, and controls an adjustable discharge angle of one or more deflectors, based on the matched data.

The invention in one form is directed to a header assembly for an agricultural combine harvester, including a plurality of row units, and a plurality of chopper/blower units. Each chopper/blower unit is positioned below a respective row unit and has a discharge outlet. At least two of the chopper/blower units have a discharge chute connected with the discharge outlet, and a deflector positioned at a discharge end of the discharge chute. Each deflector is independently adjustable to direct crop material toward a windrow formed under the combine harvester.

The invention in another form is directed to a chopper/blower unit for a row unit of a header used on an agricultural combine harvester. The chopper/blower unit includes a housing having a discharge outlet, and a plurality of rotating chopper blades within the housing. At least some of the chopper blades have a wing for blowing chopped crop material. A discharge chute is connected with the discharge outlet and has a discharge end. A deflector is positioned at the discharge end of the discharge chute. The deflector is adjustable to selectively direct crop material downward or toward a windrow formed under said combine harvester.

The invention in yet another form is directed to an agricultural harvester, including a base unit and a header assembly carried by the base unit. The header assembly includes a plurality of row units, and a plurality of chopper/blower units. Each chopper/blower unit is positioned below a respective row unit and has a discharge outlet. At least two of the chopper/blower units have a discharge chute connected with the discharge outlet, and a deflector positioned at a discharge end of the discharge chute. Each deflector is independently adjustable to direct crop material toward a windrow formed under the combine harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
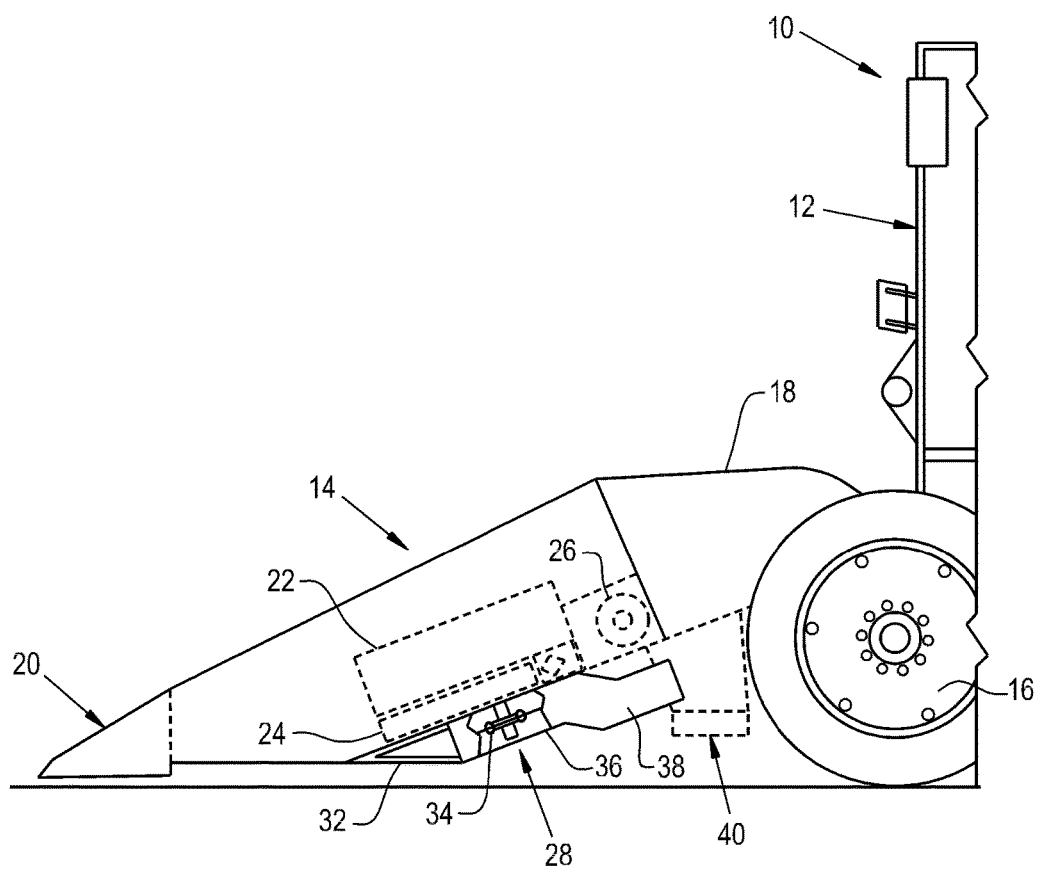
FIG. 1 is a fragmentary side view of an agricultural combine with a known header assembly.
Figure 2:
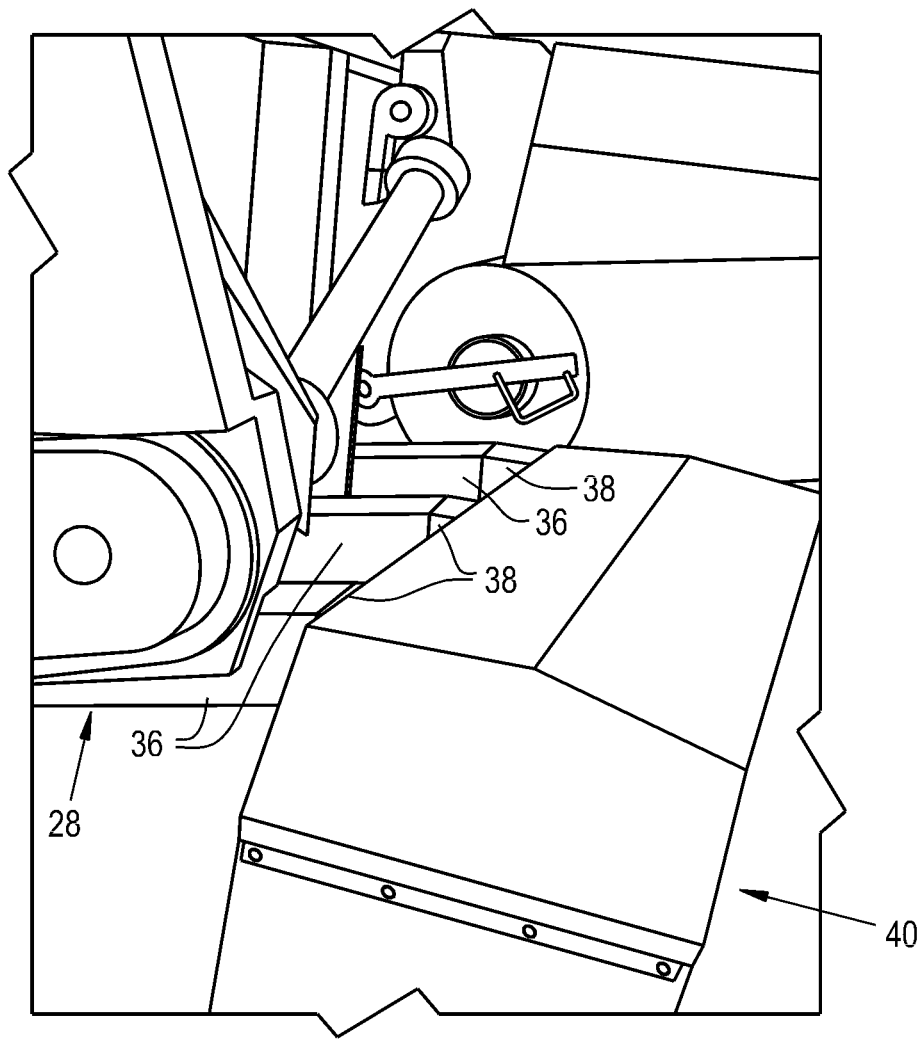
FIG. 2 is a fragmentary side perspective view of header assembly shown in FIG. 1.

Referring now to the drawings, and more particularly to FIGS. 1 and 2, there is shown a front portion of an agricultural harvester in the form of a combine 10, which generally includes a base unit 12 carrying a header 14 at the front end thereof. Base unit 12 includes front wheels 16 which are driven wheels, and rear wheels (not shown) which are steerable wheels. Base unit 12 also includes a feeder housing 18 which conveys crop material from header 14 to a threshing and separating system (not shown) within base unit 12, and is selectively vertically movable using appropriate actuators, such as hydraulic cylinders (not shown). Base unit 12 also includes other known components (not shown), such as a cleaning system, grain tank, unloading auger, etc.

Header 14 is removably mounted to the front of combine 10 and is in the form of a corn header of the fixed or non-folding variety. Header 14 includes a number of row units, each associated with and positioned between a pair of gathering shoes or snouts 20. Each row unit includes a picking assembly 22 with a pair of rotating stalk rolls or stripper rolls 24. As combine 10 moves forward in a harvesting direction, the row of stalks for each row are stripped downward by stripper rolls 24 and the ears of corn are moved rearwardly toward double-fed cross feed auger 26, which moves the ears of corn laterally inward toward feeder housing 18.

Positioned below each row unit is a chopper assembly 28 which chops the stalks and leaves (also called stover) which are stripped downward by stripper rolls 24, blows the chopped stover rearward to a conveyor system 30, and conveys the chopped stover laterally inward to form a windrow. More particularly, as described in U.S. Pat. No. 8,087,223 which is incorporated herein by reference, each chopper assembly 28 includes a pair of guides 32 which basically form small snouts positioned on either side of the row of corn stalks. As the stalks are stripped downward by stripper rolls 24, rotating cutter blades 34 within housing 36 blow the stover rearward through a long discharge chute 38. Each discharge chute 38 terminates at and dumps into conveyor system 40, which includes a pair of conveyors 40A and 40B which convey the chopped stover laterally inward to form a windrow under feeder housing 18, between front wheels 16 (FIGS. 2 and 3).

Figure 3:
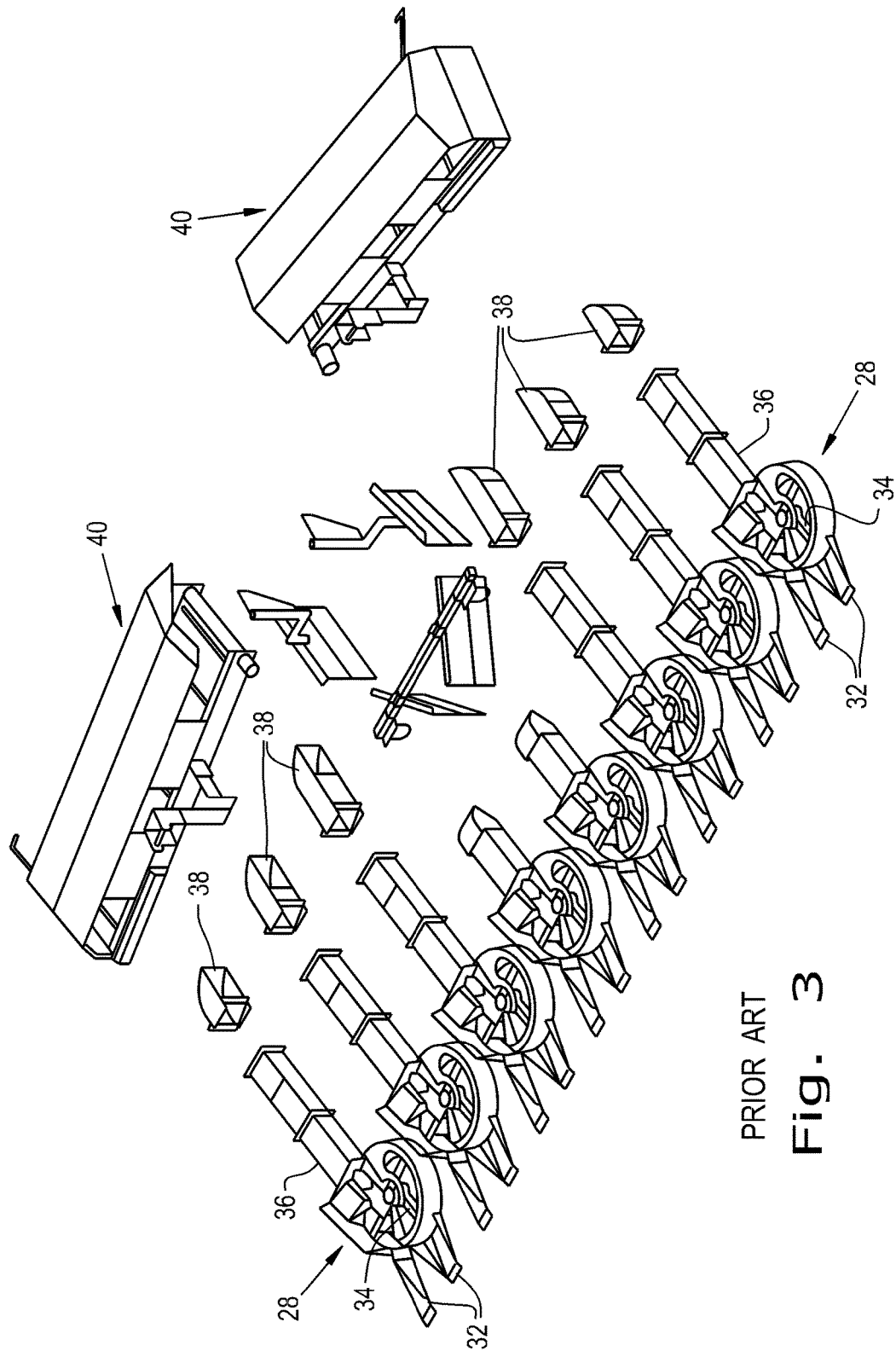
FIG. 3 is an exploded perspective view of the chopper assembly shown in FIGS. 1 and 2.

As can be seen in each of FIGS. 1-3, the conveyor system 40 is positioned well to the rear of header 14, and long discharge chutes are used to connect the chopper assemblies 28 with the conveyor system 40. This arrangement is relatively bulky with long travel paths for the stover. This arrangement tends to work well when used with dry stover, but also tends to plug when used with wet stover. Moreover, the use of conveyor system 40 at the rear of the header 14 does not allow the stover chopping and windrowing system to be used with folding corn heads.

Figure 4:
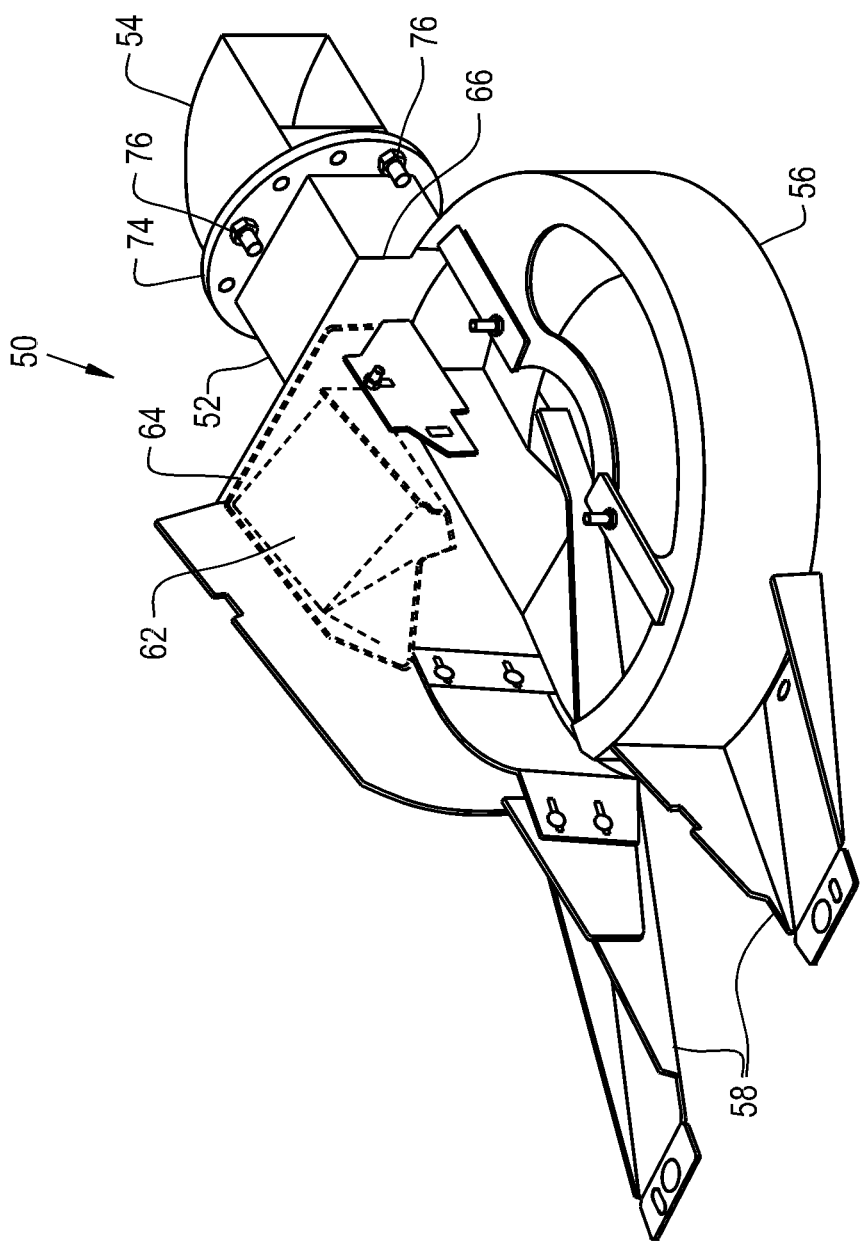
FIG. 4 is a perspective view of an embodiment of a chopper/blower unit of the present invention, which may be used with a header such as shown in FIGS. 1-3.
Figure 5:
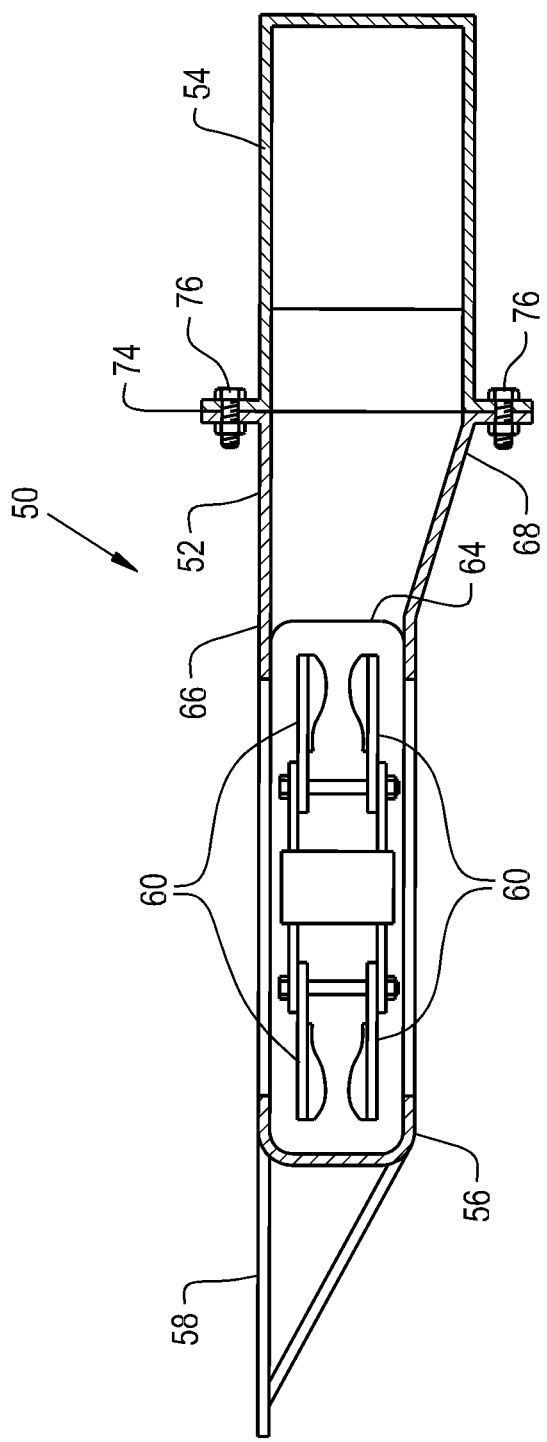
FIG. 5 is a side view of the chopper/blower unit shown in FIG. 4.

According to an aspect of the present invention, and referring now to FIGS. 4 and 5, separate chopper/blower units 50 are respectively associated with each row unit of header 14. Rather than using long discharge chutes 38 and a conveyor system 40 at the rear of the discharge chutes 38, each chopper/blower unit 50 uses relatively short discharge chutes 52 and an adjustable deflector 54 at the rear of the discharge chute 52. This arrangement allows each chopper/blower unit 50 to directly discharge stover toward the windrow which is formed underneath combine 10.

Figure 6:
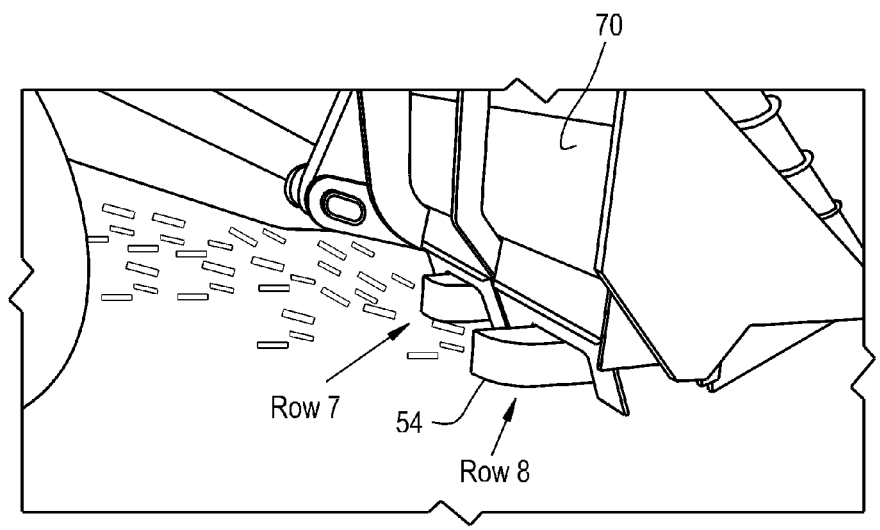
FIG. 6 is a right side perspective view of a header assembly of the present invention during operation, including chopper/blower units such as shown in FIGS. 4 and 5.
Figure 7:
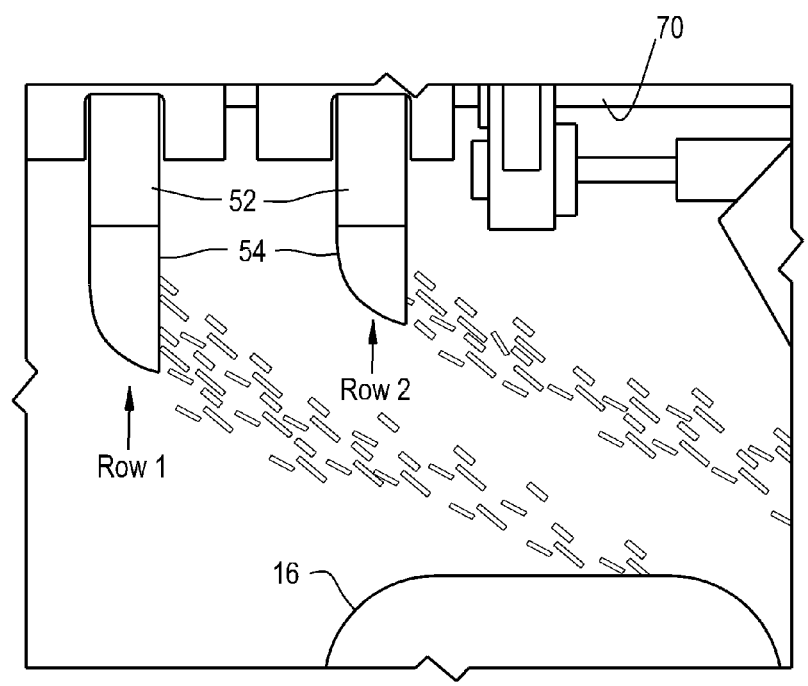
FIG. 7 is a top view of the header assembly shown in FIG. 6.
Figure 8:
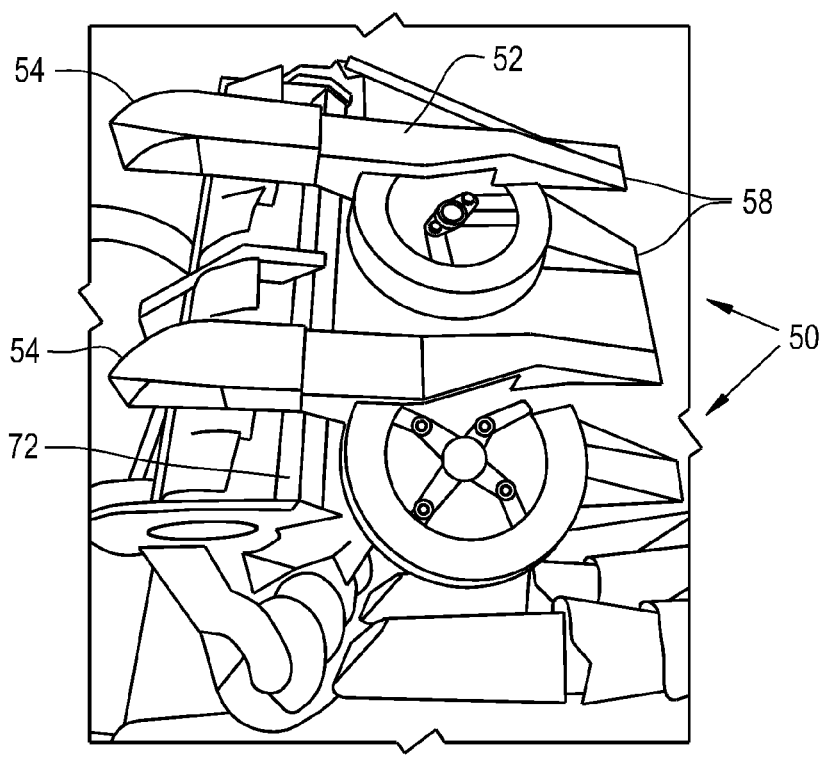
FIG. 8 is a perspective view of the header assembly shown in FIGS. 6 and 7, with the header in a folded state.
Figure 9:
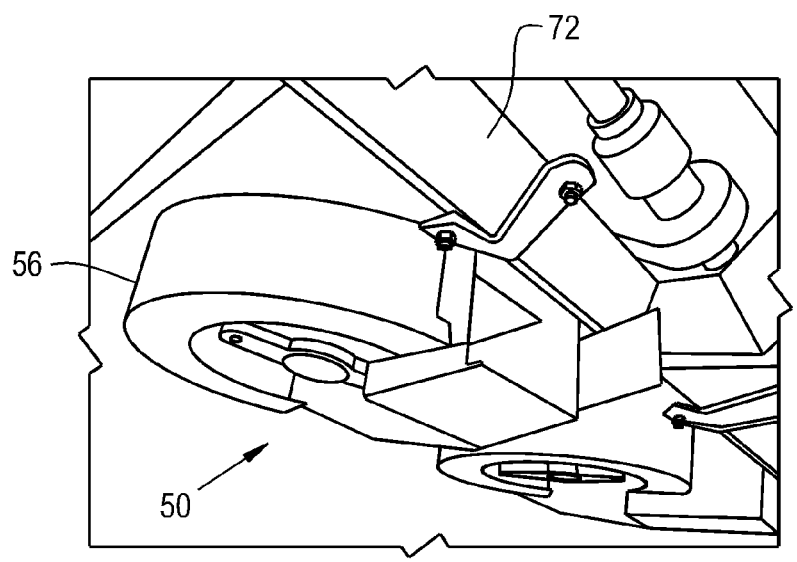
FIG. 9 is a perspective view of another embodiment of a chopper/blower unit of the present invention, which may be used with the center rows of the header assembly.
Figure 10:
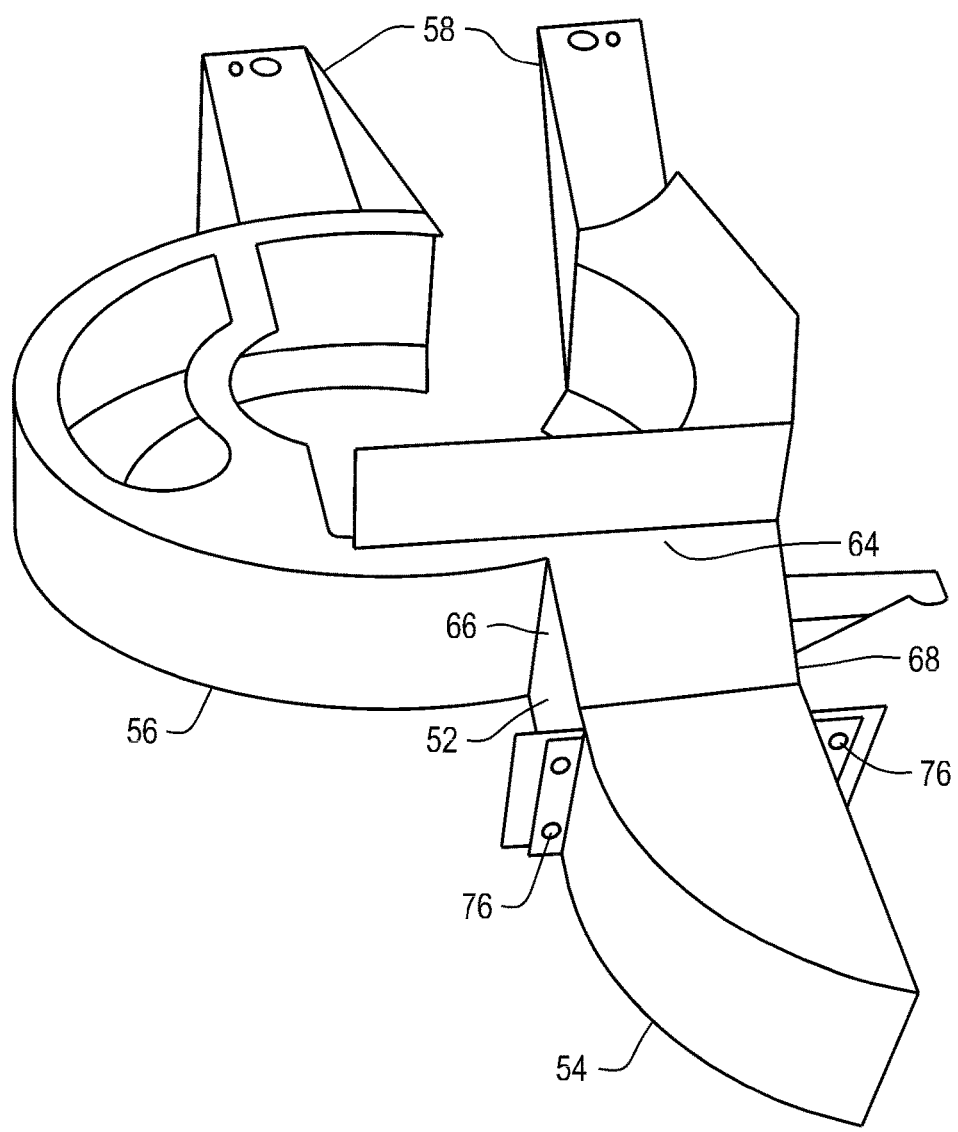
FIG. 10 is a perspective view of another embodiment of a chopper/blower unit of the present invention, including a short discharge chute and short elbow.

More particularly, a circular housing 56 defines guides 58 at the forward end thereof. Each guide 58 defines a tapered slot-like opening through which the stalks pass to the interior of housing 56. Cutter blades 60 rotate within housing 56 at a high rotational speed and chop the stover which is pushed in a downward direction by the stripper rolls 24. A wedge 62 helps to guide the stalks into the interior of housing 56 as they are stripped downward; however, it has also been found that it is preferable for most applications to remove wedge 62 (as indicated by the dashed lines). Housing 56 has a discharge outlet 64 which is in communication with an inlet end 66 of the discharge chute 52. Discharge chute 52 has a length which is much less than the length of discharge chute 38 shown in FIGS. 1-3, and thus provides much less resistance to the flow of stover therethrough. Discharge chute 52 is shown with a rectangular cross-sectional profile, but can have a different cross-sectional shape, such as a square or circular cross-sectional shape, etc. Discharge chute 52 has a discharge end 68 which terminates at a location which is generally aligned with or in front of a rear wall 70 of header 14 (FIGS. 6 and 7). In the illustrated embodiment, header 14 has a main frame beam 72 which is slightly in front of the rear wall 70, and each discharge chute 52 has a discharge end 68 which terminates at or slightly in front of the main frame beam 72 (FIGS. 8 and 9).

For a number of the row units, the deflector 54 is connected to the discharge end 68 of discharge chute 52. Each row unit need not necessarily include a deflector 54; however, at least some of the row units do include a deflector 54. In the illustrated embodiment, the two center rows closest to the longitudinal center line (not labeled) of the header 14 do not include a deflector 54 (see FIG. 9). These rows are already in line with the windrow under feeder housing 18 and therefore can simply eject the chopped crop material rearward onto the windrow. However, the laterally outer row units are not in line with the windrow and therefore it is necessary to adjust the trajectory of the crop material which is discharged from the rear of each chopper/blower unit 50 so that it mostly lands on top of the windrow which is formed under feeder housing 18 (see FIGS. 6 and 7). Each deflector 54 is shown as an elbow with a predetermined length and radius of curvature. However, for some applications it is possible that deflector 54 can be differently configured, such as an angled plate (fixed or adjustable), etc. The length of each elbow deflector 54 can vary from one row to the next. In the embodiment of the outer rows shown in FIGS. 6 and 7, the elbow deflectors 54 are successively staggered in a fore-to-aft manner from one row unit to the next row unit, such that the longest elbow is used on the laterally outer most row, the next longest elbow is used on the next to outer row, etc. However, for some applications it may be desirable to use the same length elbows on all row units, or switch the staggered relationship of the elbows such that the shortest elbow is on the laterally outer most row.

Each deflector 54 is independently adjustable relative to the attached discharge chute 52 so as to allow the discharge trajectory of the crop material to be adjusted to point toward the windrow which is formed under feeder housing 18. As shown in FIGS. 4 and 5, the inlet end of deflector 54 and the discharge end 68 of discharge chute 52 may each include a circular flange 74 with a number of radially spaced aligned holes for receipt of bolts 76. Deflector 54 may be rotated to the desired angular orientation and secured in place using bolts 76. Alternatively, a bolt on clamp may be used around the periphery of circular flange 74. Other methods of adjustably securing deflectors 54 to discharge chutes 52 are also possible.

By eliminating the conveyor system at the rear of the header, it is also possible to use the chopper/blower units 50 with a folding corn header. Referring to FIG. 8, the outer row units of the corn header 14 are shown in a folded state. Shortening of the discharge chutes 52 and elbow deflectors 54 not only reduces the flow resistance of the crop material and required horse power, but also allows the header 14 to be folded. Not only did the prior art design include a conveyor system which prevented folding, but also included discharge chutes that extended considerably past the rear wall of the header 14 and would have likely hit the operator cab if folded, even assuming arguendo that they could have been folded (which they could not).

Specific design configurations for different row units of header.

The following description discusses in a row by row manner the changes that were made to the chopper/blower units 50 to optimize performance and reduce overall power requirements. For the 8 row corn header 14 example shown in the drawings, the row unit numbers are established when sitting in the operator position within the operator cab, with the row unit No. 1 being on the left and the row unit No. 8 being on the right.

Row units 1, 2, 7 and 8 (laterally outer 2 rows on each side)

The rotors with wind blades (old and new type of wind blades) are both able to project the material from the outer rows to the windrow under the elevator. With the original long discharge chutes, it worked acceptably but because of the long transport distance of the crop material, the chance of plugging is increased. Even with the short elbow deflector element mounted on the outer rows, the material was still partially projected onto the tires.

The short elbow deflector 54 was mounted on the outer row, which is better than when the medium length elbow was mounted on row 1. In all cases, there was some minor spillage of material.

In the current set-up, without conveyor belts, there is no reason anymore to have these long discharge chutes. The deflector elbows just need to be able to project the crop to the region under the feeder housing 18, and this can happen as close as possible behind the header rear wall 70.

The length of the discharge chute 52 was shortened as much as possible, at the place of the main header frame/beam 72. Different length of deflector elbows were tested attached to the short discharge chutes; short, medium and long elbows. With the chosen length of the shortened discharge chutes 52, adding the middle length elbow deflectors 54 appeared to be the best solution for rows 1, 2, 7 and 8.

The fast evacuation system (i.e., bottom evacuation door) was no longer available in the shorter discharge chutes. With the short discharge chutes, it is proposed to work with an easy elbow deflector attachment system, in such a way that these elbow deflectors can be adjusted to be mounted in swathing mode blowing to the area under the feeder housing 18, or in non-swathing mode blowing downward to the ground. This may be achieved just by rotating these elbow deflector by 90° in the direction of the soil.

The deflector elbows 54 had a different inclination as the discharge chutes themselves in the original system, which appears to be negative with the short discharge chutes. The deflector elbows 54 need to be mounted in line with the short discharge chutes. This is because the crop needs to be projected over the stubble, which was not the case with the original inclination pointing more to the soil. This created crop spillage.

Row unit 3—

The third row unit was originally equipped with a long discharge chute, same as row units 1, 2, 3 and 4. Here, we followed the same design philosophy, just trying to keep it as simple as possible and do nothing more than make sure the crop is projected between the wheels.

The short discharge chute with long elbow deflector is located just below the PTO shaft, easily projecting the material between the wheels. The long elbow deflector was also tried, but later the short elbow deflector was used with no problems. The inclination of the elbow deflector could even be a little less aggressive, crop is projected almost to the other side of the windrow which is not necessary.

Row unit 6—

Row 6 is the most difficult row, as the discharge chute 52 is interfering with the header frame. In a first attempt, a hole was made in the discharge chute 52 to be able to mount the long discharge chute. This piece of the frame was decreasing the height of the discharge chute by almost 50%, and obviously created a lot of blockages. The resistance in this discharge chute was always higher than in the other discharge chutes. Very often, this row had trouble to get rid of the corn straw. You could clearly see this on top of the header, the stalks having trouble to be pulled downwards by the stalk rolls because the chopper knives could not evacuate the crop fast enough anymore. Crop remaining in this chopper/blower unit 50 would require a huge amount of power for that one row, the RPM of that row and thus of all rows would go down and finally several rows would be blocked. This was the typical behavior caused by this frame interference.

Also here, there is no need for such a long discharge chute, we only need to redirect the crop in between the wheels. In this case, this would mean about 0.3 m compared to the original discharge chute location. So we opened up the rear end of this unit, and provided it with a very simple, straight forward deflector directing the crop just next to the interfering frame. The crop is diverted from the original path which was a straight line backwards. The crop is now chopped and projected/disposed between the wheels of the combine. The circular path of the unit has been adapted, adding a straight deflector mounted as a tangent to the circle but now pointing in another direction which is the middle of the combine elevator. This to prepare/force the crop to leave the circular path, but a little later. The vertical metal scraper at the bottom of the unit has been changed and redirected, to fulfill this function in a new location and give another direction to the crop. The back hole has been replaced, shifted a little more to the middle of the unit.

Row units 4 and 5 (two center rows closest to longitudinal centerline of header)—

These middle rows were equipped with shorter discharge chutes. The middle row units were not a big problem. They only got blocked when header RPM went down, most likely because of blockages in other rows. Typical would be row 6 or the two outer rows, but this did vary.

With the aim to keep it simple and to only deliver the work that is strictly needed, we wanted to have a system for row units 4 and 5 that does chop, but did not project the crop in a discharge chute. We saw no reason to spend energy for this, and preferred to drop the material at the place of chopping which would become the middle of the windrow. Two options were open for this—use an existing unit but open the rear end part completely and thus work without a discharge chute, or remove the whole unit and only keep the knives. We tested the second alternative, which worked very well functionally. However, it is anticipated that the commercial version will likely have a blower housing around the blades. This unit would be very similar to the unit from row 6, wider open back side, but then without the additional deflector that is not needed here.

The knives on the 2 levels of the chopper/blower unit were kept. This is needed to have the same stubble height over the whole width of the header. The blower wings on the knife blades, meant to project the crop, were demounted. The goal is still to chop the crop with the 2 level knife system, but then drop the crop on the ground on the same spot without trying to transport it backwards.

Figure 11:
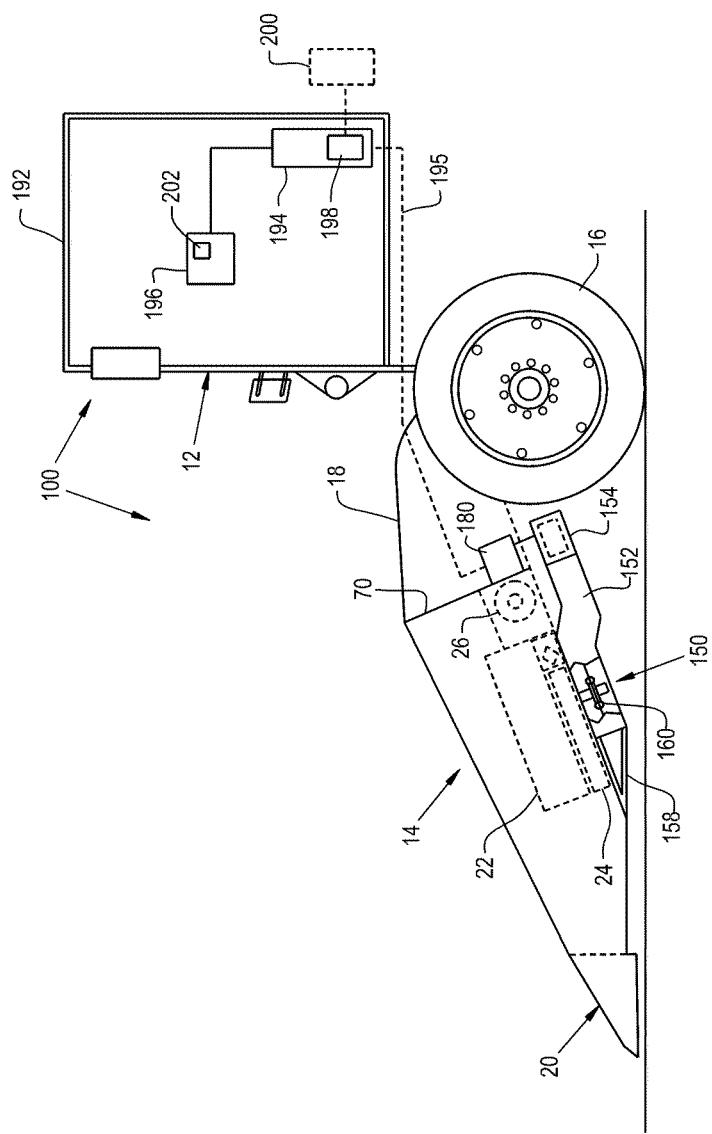
FIG. 11 is a fragmentary side view of an agricultural combine with a header assembly including another embodiment of a chopper/blower unit of the present invention.

Referring now to FIG. 11, there is shown a front portion of an agricultural harvester in the form of a combine 100. Similar to combine 10 shown in FIG. 1, combine 100 includes a number of conventional components, with such conventional components having like reference numbers in both figures. For example, combine 100 includes a base unit 12, header 14, front wheels 16, feeder housing 18, snouts 20, picking assemblies 22 and stripper rolls 24. Such components are described in more detail above with reference to FIG. 1, and not described in further detail with regard to FIG. 11.

According to another aspect of the present invention, positioned below each row unit is a chopper/blower unit 150 which chops the stover which is stripped downward by stripper rolls 24, and blows the chopped stover rearward at a selected discharge angle. Each chopper/blower unit 150 can be variously configured with different length discharge chutes, deflector or no deflector, curved or angled plates at the discharge end of the deflector, etc, similar to the embodiments of chopper/blower unit 50 described above. Chopper/blower units 150 primarily differ from chopper/blower units 50 in that some or all can be adjusted during operation either on-command (based on operator input) or automatically (using precision farming data) to discharge the stover at a desired discharge angle.

Figure 12:
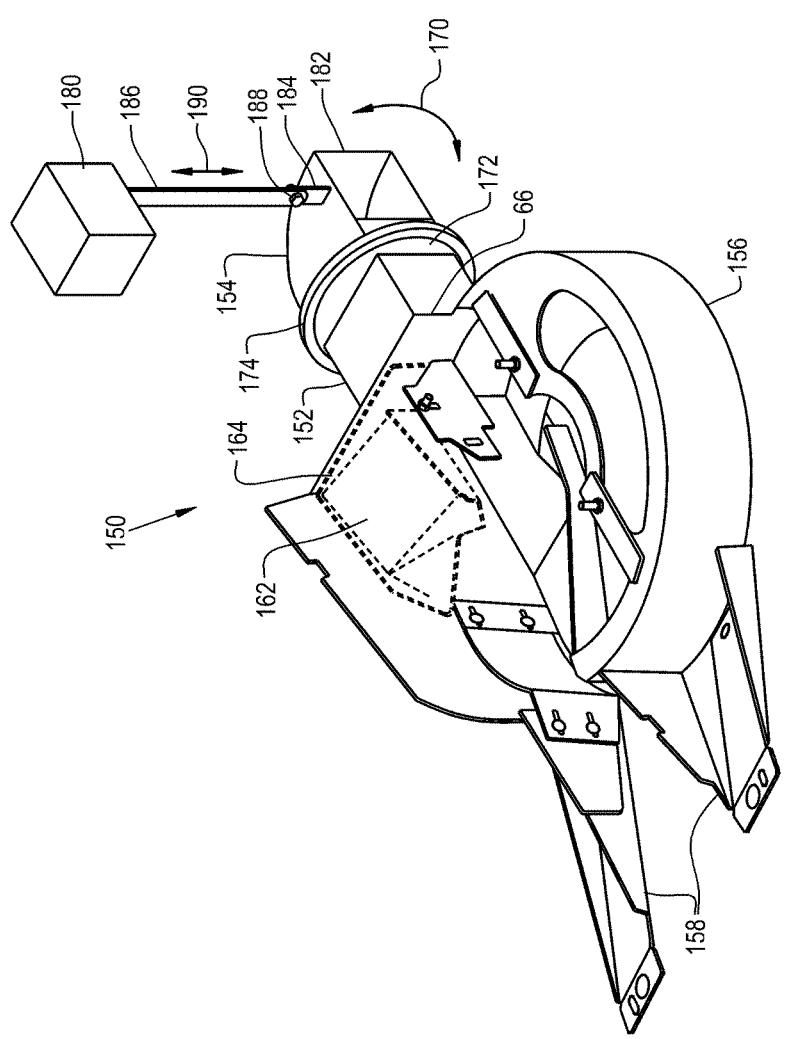
FIG. 12 is a perspective view of one of the chopper/blower units of the present invention, which may be used with the header shown in FIG. 11.
Figure 13:
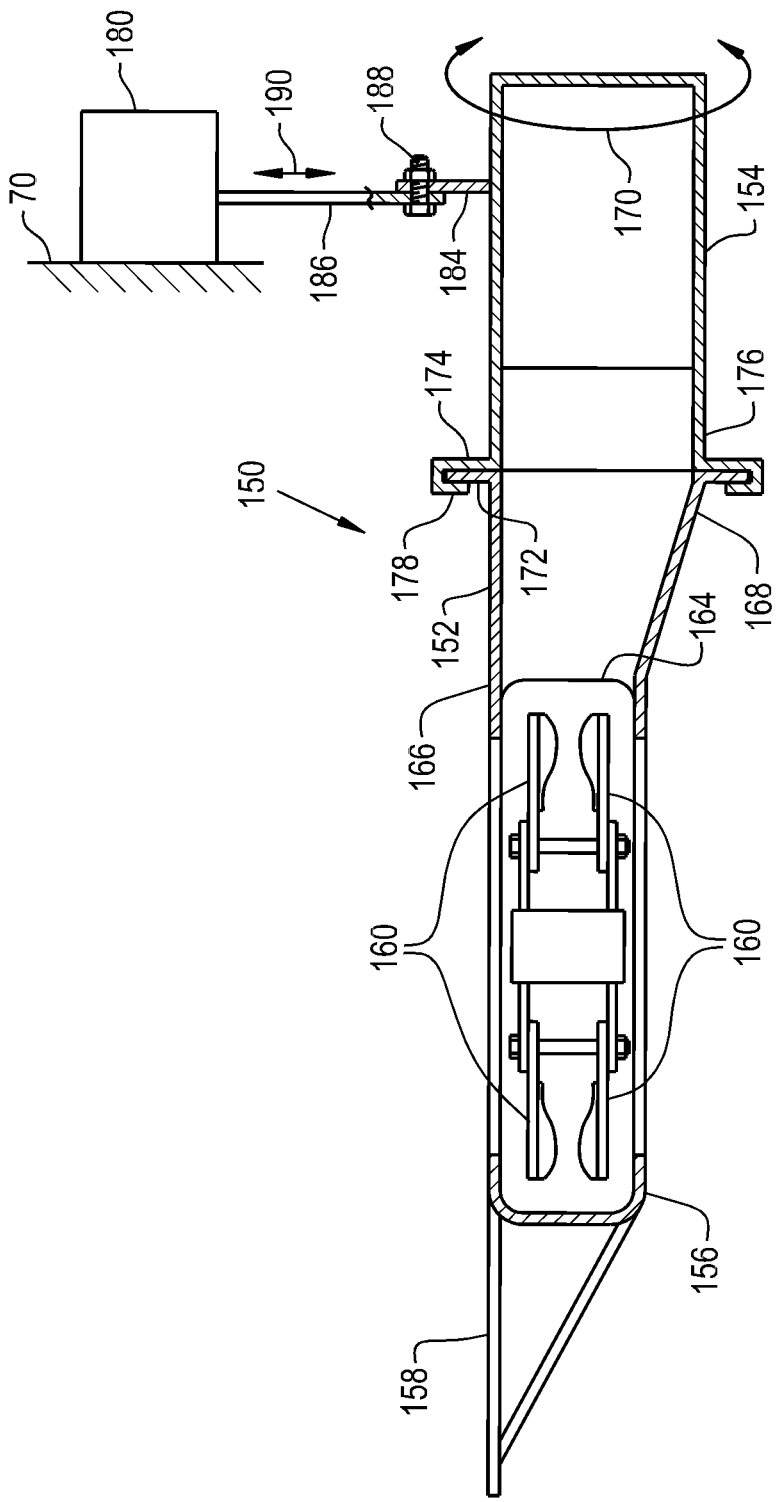
FIG. 13 is a side sectional view of the chopper/blower unit shown in FIGS. 11 and 12.

Referring to FIGS. 11-13, conjunctively, chopper/blower unit 150 includes a discharge chute 152 and an adjustable deflector 154 at the rear of the discharge chute 152. A circular housing 156 defines guides 158 at the forward end thereof. Each guide 158 defines a tapered slot-like opening through which the stalks pass to the interior of housing 156. Cutter blades 160 rotate within housing 156 at a high rotational speed and chop the stover which is pushed in a downward direction by the stripper rolls 24. A wedge 162 helps to guide the stalks into the interior of housing 156 as they are stripped downward; however, it has also been found that it is preferable for most applications to remove wedge 162 (as indicated by the dashed lines). Housing 156 has a discharge outlet 164 which is in communication with an inlet end 166 of the discharge chute 152. Discharge chute 152 has a discharge end 168 which terminates at a location which is generally aligned with or in front of a rear wall 70 of header 14.

Rather than being rigidly affixed, or manually adjustable such as shown in FIGS. 4 and 5, deflector 154 defines an adjustable component that is rotatably coupled with the discharge end 168 of discharge chute 152, as indicated by the double headed arrow 170. The rotatable coupling allows deflector 154 to be selectively and remotely positioned at a desired orientation providing a desired discharge angle of the stover during a field mode operation of combine 10. More particularly, in the illustrated embodiment, discharge chute 152 includes a circular flange 172 at discharge end 168. Deflector 154 includes a circular flange 174 at the inlet end 176 thereof having a lip 178 which extends over the radial periphery of circular flange 172. Lip 178 is configured to provide a slight clearance with circular flange 172, such that deflector 154 can rotate relative to discharge chute 152.

Deflector 154 is coupled with an actuator 180 at the discharge end 182 thereof which selectively rotates deflector 154 to a desired discharge orientation. In the embodiment shown, an ear 184 is affixed to and extends from the discharge end 182 of deflector 154. A flat rod 186 or other suitable connection member has a lower end which is connected to ear 184 in a manner allowing pivotal movement therebetween. In the illustrated embodiment, flat rod 186 is bolted to ear 184 using a bolt and lock nut arrangement 188 with the lock nut not being entirely tightened so as to allow pivotal movement. The flat rod 186 has an upper end which is connected with with actuator 180 in a suitable manner.

Actuator 180 is mounted to suitable structure on header 14, such as the rear wall 70, and is configured to move deflector 154 in a manner effecting a desired discharge orientation of deflector 154. In the illustrated embodiment, actuator 180 is a linear actuator as indicated by double-headed arrow 190. Suitable types of actuators can include a stepper motor, two-way fluid operated cylinder (e.g., pneumatic or hydraulic), or other suitable actuator. Depending on the type of actuator, the structure interconnecting the actuator with the deflector 154 can vary.

Referring again to FIG. 11, located within an operator station 192 are an electrical processing circuit 194, a visual display 196 and a memory 198. Memory 198 may be integrated within electrical processing circuit 194, as shown, or may be separate from and coupled with electrical processing circuit 194. Memory 198 may be any suitable type of memory, such as a static or dynamic memory. Memory 198 may include any type of relevant data, including precision farming data which may be generated by the operator or obtained from a number of different commercial sources (represented by the dashed box 200). Such data can be uploaded to memory 198 using any suitable technique, such as a direct wired or wireless upload, wireless Internet upload, satellite upload, etc. The precision farming data may be of different data types, such as a topographical map of the geographic area; at least one soil type associated with the geographic area; at least one fertility level of soil associated with the geographic area; and at least one pH level of soil associated with the geographic area.

Visual display 196 is coupled with electrical processing circuit 194 and provides a visual display to an operator located within operator station 192. Visual display 196 can display a number of different types of visual information, including precision farming data associated with a field being harvested, whether the chopper/blower units 150 are in a windrowing or a chopping/spreading mode of operation, a current orientation of one or more deflectors 154, etc. Visual display 196 may be any suitable type of display, such as an LED display, LCD display, etc.

Electrical processing circuit 194 is shown as a digital electronic controller in FIG. 11, but could also be configured as an analog type processing circuit. Electronic controller 194 is coupled with each of the actuators 180, either wired or wireless, as indicated by dashed line 195, and selectively controls the operation of the actuators 180 either automatically or on command. For "on-command" control of actuators 180, an operator within operator station 192 can manually depress a switch or button, such as a virtual button 202 on visual display 196. A corresponding output signal is provided from visual display 196 to electronic controller 194, which in turn controls operation of actuators 180 to effect a desired discharge orientation of chopper/blower units 150. The desired discharge orientation can be the same or different from one row to another, and not all rows may need a controllable discharge orientation.

For automatic control of actuators 180 electronic controller 194 receives precision farming data from memory 198 associated with a geographic area such as a field being harvested. Electronic controller 194 matches global positioning system (GPS) data corresponding to the position of the combine with the precision farming data to establish a desired discharge orientation for one or more deflectors 154. Electronic controller 194 then controls actuators 180 to position the corresponding deflectors 154 at the desired discharge orientations. An operator can optionally be prompted on visual display 196 to accept the discharge orientation of the chopper/blower units 150, or can manually override the discharge orientation based on the matched precision farming data.

During a harvesting operation, it may be desirable to change the discharge orientations of one of more deflectors 154 when changing from one field to another, or within different geographic areas within a same field. For example, for one field it may be desirable to windrow the stover, while for another field it may be desirable to chop and spread the stover in a rearward direction without windrowing. Such windrowing and/or chopping/spreading may also occur within different areas of a same field being harvested, based on visual observation and/or precision farming data. Further, it may be desirable to position some of the deflectors 154 to windrow the stover, while others direct the stover in a downward or rearward direction onto the field. The controllable chopper/blower units 150 allow such adjustment to occur on-the-fly during field operation, either on command and/or automatically, without the need to shut down the machine and manually reconfigure the individual chopper/blower units.

According to the embodiment of chopper/blower unit 150 shown in FIGS. 11-13, discharge chute 152 is stationary and deflector 154 moves relative to discharge chute 152. This configuration allows the discharge chute to remain stationary under the header 14, which may be a requirement because of space considerations for some headers. For other headers, it may be possible for deflector 154 to be immovably coupled with discharge chute 152, and the discharge chute 152 movably coupled with the blower housing 156. Broadly speaking, an aspect of the present invention shown in FIGS. 11-13 is that the discharge orientation of the chopper/blower units can be adjusted, either on command or automatically.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A header for an agricultural harvester, comprising:
   a plurality of row units;
   a plurality of chopper/blower units, each positioned below a respective one of the plurality of row units and each comprising a discharge outlet, at least two of the plurality of chopper/blower units comprising a discharge chute connected with the discharge outlet of each of the at least two of the plurality of chopper/blower units;
   at least two deflectors, each positioned at a discharge end of the discharge chute of a respective one of the at least two of the plurality of chopper/blower units, each deflector being independently adjustable to place crop material directly onto a common windrow formed under said combine harvester.

2. The header of claim 1, wherein each of the least two deflectors is rotatable relative to a longitudinal axis of the respective one of the at least two of the plurality of chopper/blower units.

3. The header of claim 1, wherein said header further comprises a rear wall, and wherein the discharge end of the discharge chute of each of the at least two of the plurality of chopper/blower units is generally aligned with the rear wall.

4. The header of claim 1, wherein each of the at least two deflectors is a curved elbow.

5. The header of claim 1, wherein the header has a longitudinal centerline, and the at least two deflectors are successively staggered in a fore-to-aft manner from one of the plurality of row units to an adjacent one of the plurality of row units.

6. The header of claim 1, wherein the header has a longitudinal centerline, and wherein at least two of the plurality of chopper/blower units closest to the longitudinal centerline do not include respective discharge chutes and deflectors, and a remainder of the plurality of chopper/blower units do include respective discharge chutes and deflectors.

7. The header of claim 6, wherein each deflector is configured to discharge crop material toward the longitudinal centerline.

8. The header of claim 6, wherein two of the plurality of chopper/blower units closest to said longitudinal centerline do not include respective discharge chutes and deflectors, and wherein the two of the plurality of chopper/blower units closest to said longitudinal centerline further comprise knife blades for chopping crop material, but no blower arrangement for blowing the crop material.

9. The header of claim 1, wherein the discharge chute of each of the at least two of the plurality of chopper/blower units is a closed discharge duct.

10. The header of claim 1, wherein the at least two of the plurality of chopper/blower units are each remotely adjustable during a field mode operation of the harvester.

11. The header of claim 10, wherein the discharge chute and the deflector of each of the at least two of the plurality of chopper/blower units each include a circular flange which mate with each other so as to allow rotation of the deflector relative to the discharge chute of each of the at least two of the plurality of chopper/blower units.

12. The header of claim 11, wherein the at least two of the plurality of chopper/blower units each further comprises an actuator coupled with the deflector of the respective one of the at least two of the plurality of chopper/blower units.

13. The header of claim 12, wherein the actuator of each of the at least two of the plurality of chopper/blower units is a linear actuator connected with the deflector of the respective one of the at least two of the plurality of chopper/blower units.

* * * * *